(12) United States Patent
Maria Saguer et al.

(10) Patent No.: US 9,001,400 B2
(45) Date of Patent: Apr. 7, 2015

(54) TO ENABLE MODIFICATION OF COLOR CHARACTERISTICS OF AN IMAGE

(71) Applicant: Hewlett-Packard Development Company, L.P., Houston, TX (US)

(72) Inventors: Marti Maria Saguer, Palamos (ES); Alejandra Terron Arregui, Barcelona (ES); Miguel Angel Lopez Alvarez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 111 days.

(21) Appl. No.: 13/752,536

(22) Filed: Jan. 29, 2013

(65) Prior Publication Data

US 2014/0211285 A1    Jul. 31, 2014

(51) Int. Cl.
*H04N 1/50*    (2006.01)

(52) U.S. Cl.
CPC ...................................... *H04N 1/50* (2013.01)

(58) Field of Classification Search
None
See application file for complete search history.

(56) References Cited

U.S. PATENT DOCUMENTS

| 7,215,449 | B2 * | 5/2007 | Kriss | 358/518 |
| 7,973,969 | B2 * | 7/2011 | Nakano | 358/1.9 |
| 8,121,402 | B2 | 2/2012 | Stevens | |
| 2003/0103234 | A1 * | 6/2003 | Takabayashi et al. | 358/1.15 |
| 2007/0195347 | A1 * | 8/2007 | Momose et al. | 358/1.9 |
| 2007/0273908 | A1 * | 11/2007 | Hoshii | 358/1.9 |
| 2008/0062193 | A1 * | 3/2008 | Olson | 345/591 |
| 2009/0180127 | A1 | 7/2009 | Yabe | |
| 2011/0141104 | A1 | 6/2011 | Tin | |
| 2012/0013635 | A1 | 1/2012 | Beeman | |
| 2012/0105927 | A1 | 5/2012 | Mestha | |
| 2012/0210274 | A1 * | 8/2012 | Pettigrew et al. | 715/810 |

OTHER PUBLICATIONS www.computer-darkroom.com/ps13_colour/ps13_1.htm—Computer Darkroom—Adobe Photoshop CS6 dated on or before Nov. 29, 2012 (20 pages).

* cited by examiner

*Primary Examiner* — Kimberly A Williams
(74) *Attorney, Agent, or Firm* — Hewlett-Packard Patent Department

(57) ABSTRACT

A method to enable modification of color characteristics of an image. In the method, an image, defined in a first color space, is transformed to a second color space; and display of the transformed image is controlled. A color characteristic of the transformed image is modified using a rule defined in the second color space in response to a user input, and display of the modified transformed image is controlled.

20 Claims, 4 Drawing Sheets

TO ENABLE MODIFICATION OF COLOR CHARACTERISTICS OF AN IMAGE

BACKGROUND

Printing systems are arranged to apply a printing treatment (such as ink) to media and may also include a user input device for enabling a user to control the printing system. For example, a user of the printing system may operate the user input device to perform color management on an image to be printed by the printing system.

BRIEF DESCRIPTION

Reference will now be made by way of example only to the accompanying drawings in which.

DETAILED DESCRIPTION

Figure 1:
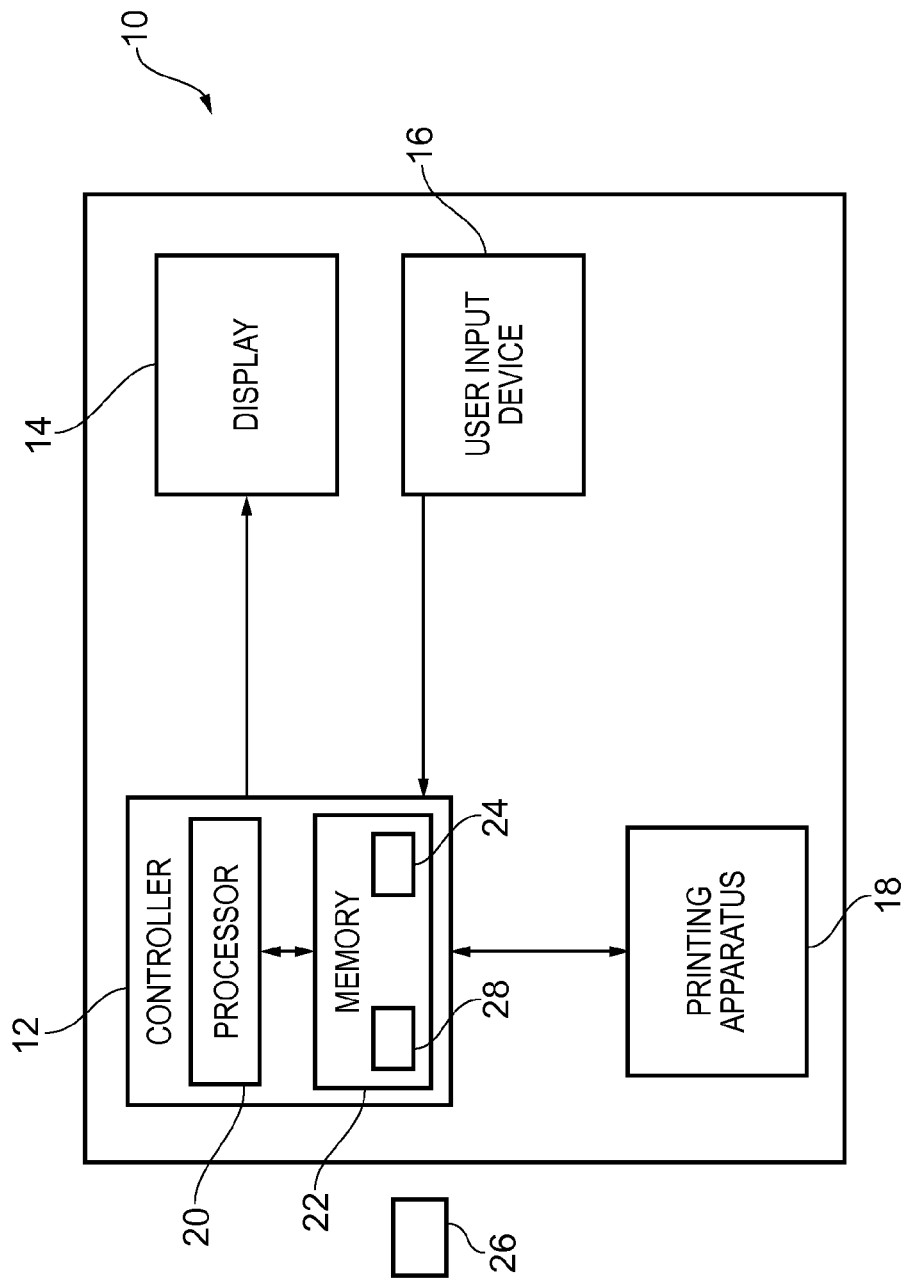
FIG. 1 illustrates a schematic diagram of apparatus to enable modification of color characteristics of an image according to an example.

FIG. 1 illustrates a schematic diagram of an apparatus 10 according to an example. The apparatus 10 (which may also be referred to as a printing system) includes a controller 12, a display 14, a user input device 16 and printing apparatus 18. The apparatus 10 may be a unitary device where the components of the apparatus 10 are housed by a single housing. In other examples, the apparatus 10 may include a plurality of physically separate devices (having separate housings) that are arranged to operate together. For example, the printing apparatus 18 may be a separate device to the remainder of the apparatus 10. In other examples, the apparatus 10 may be a module. As used here, 'module' refers to a unit or apparatus that excludes certain parts/components that would be added by an end manufacturer or a user. For example, where the apparatus 10 is a module, the apparatus 10 may only include the controller 12.

The implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor 20 that may be stored on a computer readable storage medium 22 (disk, memory etc) to be executed by such a processor 20.

The processor 20 is configured to read from and write to the memory 22. The processor 20 may also comprise an output interface via which data and/or commands are output by the processor 20 and an input interface via which data and/or commands are input to the processor 20.

The memory 22 stores a computer program 24 comprising computer program instructions that control the operation of the apparatus 10 when loaded into the processor 20. The computer program instructions 24 provide the logic and routines that enables the apparatus 10 to perform the methods illustrated and described with reference to FIGS. 2 to 7. The processor 20 by reading the memory 22 is able to load and execute the computer program 24.

The computer program 24 may arrive at the apparatus 10 via any suitable delivery mechanism 26. The delivery mechanism 26 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 24. The delivery mechanism 26 may be a signal configured to reliably transfer the computer program 24. The apparatus 10 may propagate or transmit the computer program 24 as a computer data signal.

The memory 22 also stores at least one image 28. The image 28 is defined in a first color space such as (for example) sRGB or AdobeRGB.

Although the memory 22 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The display 14 may be any suitable display and may be, for example, a liquid crystal display (LCD), a light emitting diode display (LED display), or a thin film transistor (TFT) display. The controller 12 is arranged to control the operation of the display 14. For example, the controller 12 may control the display 14 to display the image 28 stored in the memory 22. The display 14 is arranged to operate in a color space that is different to the first color space of the image 28. The color space of the display 14 may be referred to as device Red, Green, Blue (dRGB).

The user input device 16 may be any suitable device for enabling a user to control the apparatus 10. For example, the user input device 16 may comprise a plurality of buttons or keys. In some examples, the user input device 16 may be integrated into the display 14 to provide a touch screen display 14 (e.g. a resistive or a capacitive touch screen display). The controller 12 is arranged to receive user input signals from the user input device 16.

The printing apparatus 18 may include any suitable printing mechanism and may include, for example, an inkjet printer, a laser printer or a solid ink printer. The controller 12 is arranged to control the operation of the printing apparatus 18. For example, the controller 12 may read the image 28 stored in the memory 22 and control the printing apparatus 18 to print the image on a sheet or web of media (such as paper). The printing apparatus 18 is arranged to operate in a color space that is different to the first color space of the image 28. The color space of the printing apparatus 28 may be referred to as device Red, Green, Blue (dRGB).

The operation of the apparatus 10 according to an example is described in the following paragraphs with reference to FIG. 2.

At block 30, the controller 12 transforms the image 28 from the first color space to a second color space. In this example, the controller 12 transforms the image 28 from sRGB to dRGB of the printing apparatus 18 using an International Color Consortium (ICC) profile of the printing apparatus 18.

At block 32, the controller 12 controls the display 14 to display the transformed image 28. Since the image 28 has been transformed to dRGB of the printing apparatus 18, the transformed image 28 imitates what the image will look like when printed on media by the printing apparatus 18.

At block 34, the controller 12 controls the display 14 to display a user interface to enable a user to select at least one color characteristic setting for modifying the displayed transformed image. For example, the user interface may include: a first slider for the color red that may be moved between values zero and two hundred and fifty five; a second slider for the color green that may be moved between values zero and two hundred and fifty five; and a third slider for the color blue that may be moved between the values zero and two hundred and fifty five. The value two hundred and fifty five of a color represents the brightest, most saturated value of that color. The value zero of a color represents the least bright and least saturated value of that color.

In other examples, the user interface may include any other tool that enables a user to select at least one color characteristic setting. For example, the user interface may include a first dial for red, a second dial for green and a third dial for blue. By way of another example, the user interface may include a first data entry box for red, a second data entry box for green and a third data entry box for blue. Furthermore, the user interface may not be displayed on the display 14 and may instead by a physical mechanism that may be operated by a user.

At block 36, the controller 12 receives a user input defining at least one color characteristic setting. For example, a user may operate the user input device 16 to move the green slider to select a color characteristic setting that modifies the saturation and brightness of the color green in the displayed transformed image 28. The controller 12 subsequently receives the selected color characteristic setting from the user input device 16.

At block 38, the controller 12 generates a rule (defined in the second color space) using the at least one color characteristic setting received in block 36. An example of how the rule is generated is described in the following paragraphs with reference to FIGS. 3 to 7.

Figure 3:
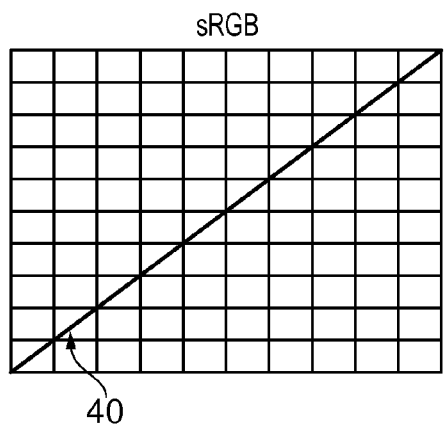
FIGS. 3 to 7 illustrate graphs of a gray axis being modified according to an example.

FIG. 3 illustrates the gray axis 40 of a first color space (sRGB in this example). The gray axis 40 is a straight line that represents the combined values of red, green and blue that provides different shades of gray. The bottom left of the gray axis 40 is the combination of the lowest values of red, green and blue (zero) and appears black. As the gray axis 40 increases (that is, as you move towards the top right of the graph), the shade of gray becomes lighter. The top right of the gray axis 40 is the combination of the highest values of red, green and blue (two hundred and fifty five) and appears white.

Figure 4:
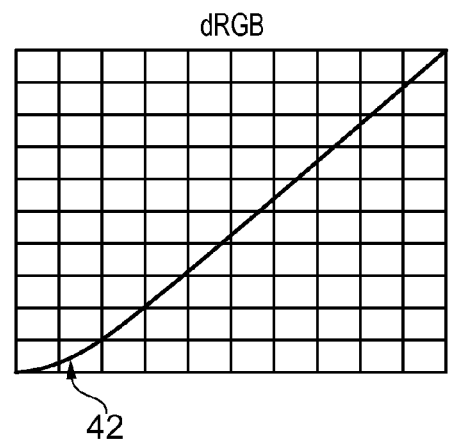

FIG. 4 illustrates a gray axis 42 that is the result of the gray axis 40 illustrated in FIG. 3 being transformed from the first color space to a second color space (dRGB of the printing apparatus 18 for example) using, for example, an ICC profile. For example, the controller 12 may transform the gray axis 40 using an ICC profile for the printing apparatus 18. The transformed gray axis 42 is similar to the gray axis 40 illustrated in FIG. 3, but differs in that the gradient of the gray axis 42 for low values of red, green and blue is lower than the gray axis 40.

Figure 5:
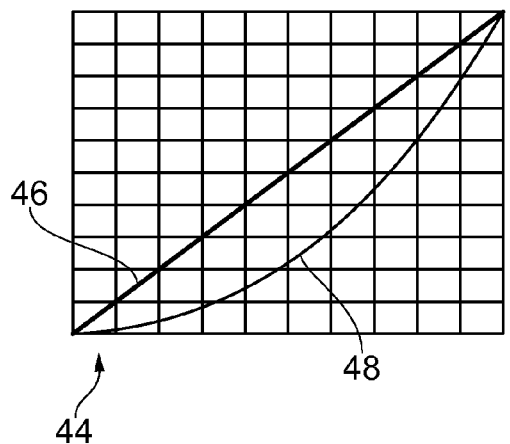

FIG. 5 illustrates a gray axis 44 that is the result of the gray axis 40 illustrated in FIG. 3 having a function applied to a color in accordance with the color characteristic setting received in block 36. For example, the controller 12 may receive a color characteristic setting to modify the gamma correction of the color green in the displayed transformed image 28. The controller 12 subsequently applies an exponential function to green in the first color space that uses the value of the color characteristic setting. Consequently, the gray axis 44 includes a straight line 46 for red and blue, and an exponential curve 48 for green.

In other words, the controller 12 implements the color characteristic setting by using an exponential curve on the color channel to which the color characteristic setting relates. For example, to obtain an increase in the green channel, the color characteristic setting would be (1, 1.2, 1) and the implementation would be modify each pixel of the image as (R^1, G^1.2, B^1). Channels R and B are unaffected (since ^1 does not change the value of R or B). However, channel B is increased by an exponent of 1.2.

Figure 6:
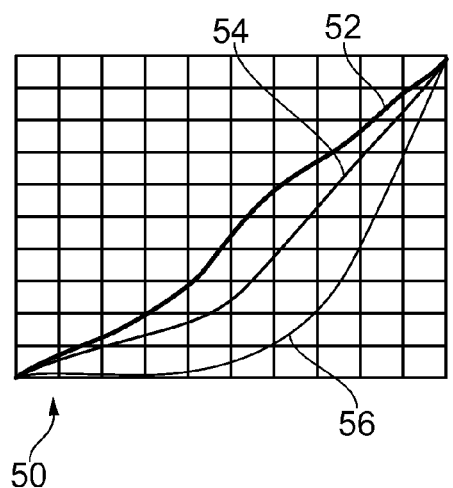

FIG. 6 illustrates a gray axis 50 that is the result of the gray axis 44 illustrated in FIG. 5 being transformed from the first color space to the second color space using, for example, an ICC profile. In more detail, the gray axis 50 includes a curved line 52 for blue, a curved line 54 for red and a curved line 56 for green.

Figure 7:
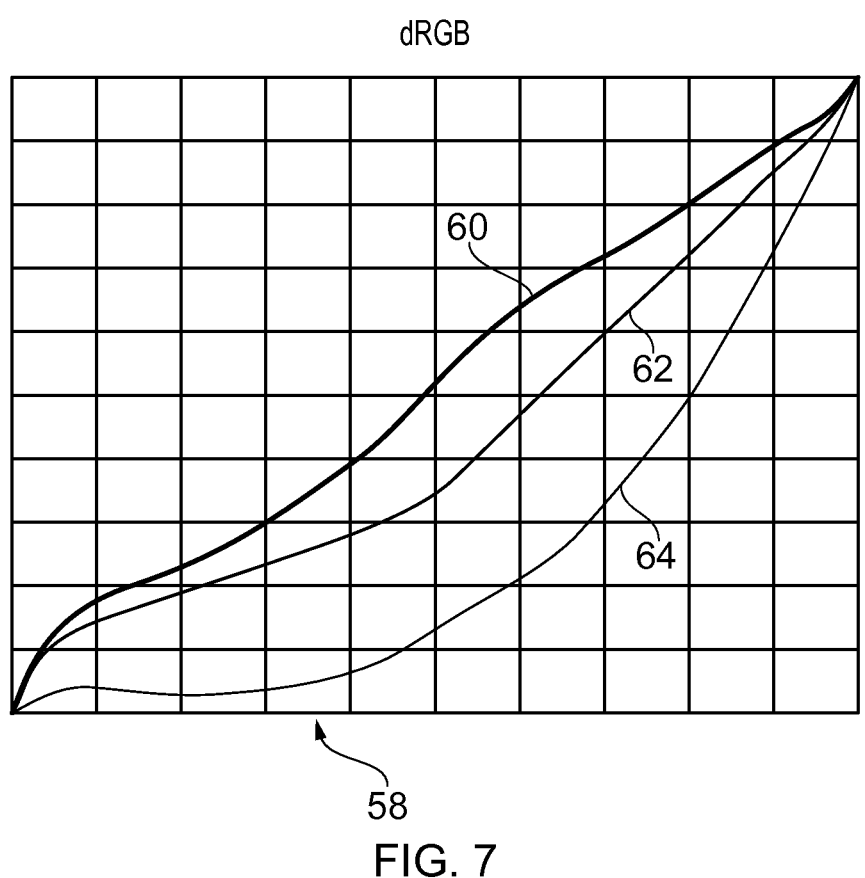

FIG. 7 illustrates a graph 58 that represents the generated rule for modifying the transformed image. The graph 58 includes a first curved line 60 for blue, a second curved line 62 for red, and a third curved line 64 for green. The controller 12 generates the graph 58 by inverting the curves 52, 54, 56 of the gray axis 58 illustrated in FIG. 6 and then composing the result with the transformed gray axis 42 illustrated in FIG. 4. Since the generated rule is formed from curves that have been transformed from the first color space to the second color space, the generated rule is consequently defined in the second color space.

Returning to FIG. 2, at block 66 the controller 12 modifies at least one color characteristic of the transformed image 28 using the rule generated in block 38. In particular, the controller 12 applies the functions for the curves 60, 62 and 64 to the red, green and blue values in the transformed image 28 to modify the color characteristics of the image. For example, where the color characteristic setting received at block 36 modifies the color green, the performance of block 66 results in the transformed image 28 having a modified appearance where the saturation of green is changed relative to the pre-modified image.

At block 68, the controller 12 controls the display 14 to display the modified transformed image 28 from block 66. The display of the modified transformed image 28 enables the user to view the effect of their selected color characteristic setting and decide what to do next. For example, the user may not be satisfied with the result of their selected color characteristic setting and may operate the user input device 16 to return the method to block 34 so that they may select alternative color characteristic settings. By way of another example, the user may be satisfied with the result of their selected color characteristic setting and may operate the user input device 16 to store the modified transformed image 28 in the memory 22. By way of a further example, the user may be satisfied with the result of their selected color characteristic setting and may operate the user input device 16 to instruct the apparatus 10 to print the modified transformed image 28.

Where the user instructs the apparatus 10 to print the modified transformed image, the method moves to block 70 and the controller 12 controls the printing apparatus 18 to print the modified transformed image 28. Since the modified transformed image 28 is displayed in the second color space of the printing apparatus 18 (e.g. dRGB), the printed version of the modified transformed image advantageously appears very similar to (or the same as) the displayed version of the modified transformed image.

The apparatus 10 provides an advantage in that since the color modification is applied to the image 28 after the image 28 has been encoded in the second color space, the modification is independent of the encoding of the image 28. Furthermore, the rule for modifying the transformed image 28 is defined in the second color space and consequently, the color characteristic setting selected by the user advantageously modifies the transformed image 28 in a predictable (and expected) manner. In particular, the curves 60, 62, 64 of the generated rule may mimic pure exponential per-channel color adjustment curves of the first color space in the second color space. For example, a selected color characteristic setting that enhances one color only may be used to generate a rule for modifying a transformed image that only enhances that selected color.

Figure 2:
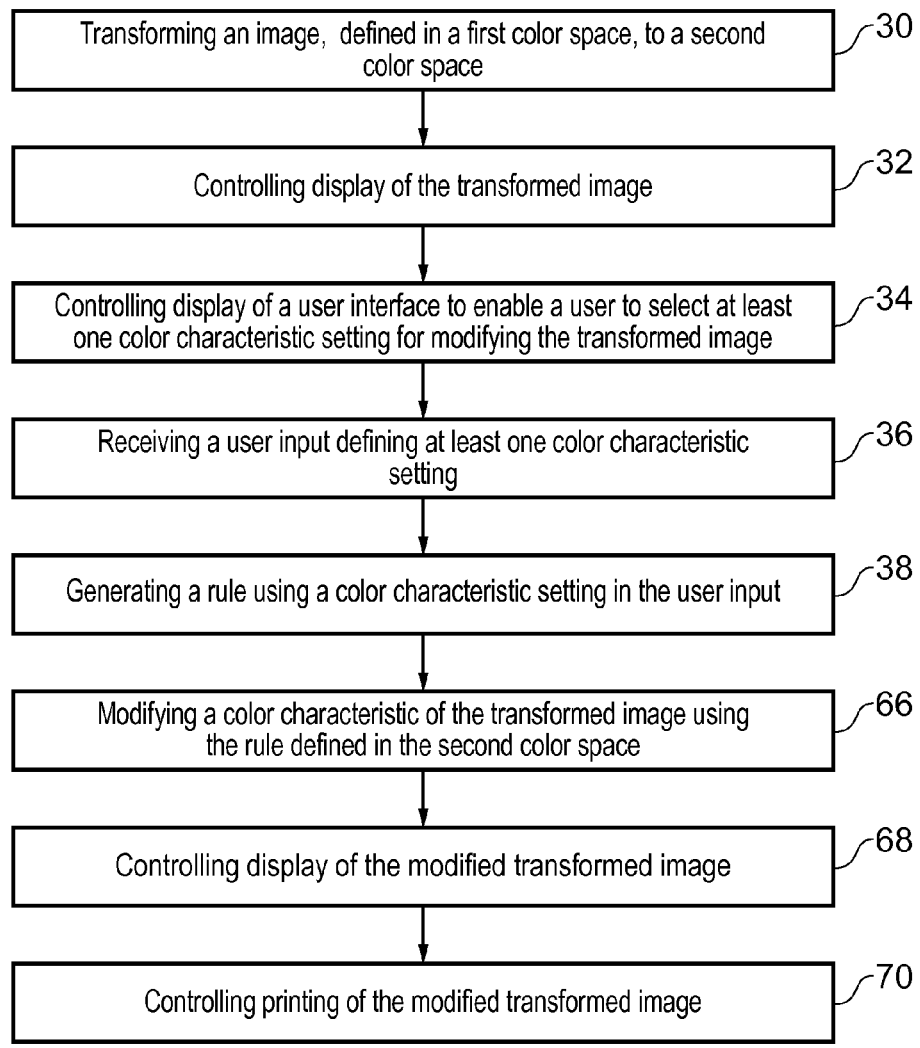
FIG. 2 illustrates a flow diagram of a method to enable modification of color characteristics of an image according to an example.

The blocks illustrated in the FIG. 2 may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Although examples of the present invention have been described in the preceding paragraphs, it should be appreciated that modifications to the examples given can be made without departing from the scope of the invention as claimed. For example, the first color space and the second color space may be different to sRGB and dRGB respectively. By way of an example, the first color space may be AdobeRGB and the second color space may be CMYK.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
transforming, by a system including a processor, an image, defined in a first color space, to a second color space;
controlling, by the system, display of the transformed image;
generating, by the system, a rule defined in the second color space using a color characteristic setting adjusted by a user input, the rule including functions representing respective colors of the second color space, the functions computed based on the color characteristic setting adjusted by the user input;
modifying, by the system, a color characteristic of the transformed image using the rule defined in the second color space, wherein modifying the color characteristic comprises applying the functions to respective color values of the transformed image; and
controlling, by the system, display of the modified transformed image.

2. A method as claimed in claim 1, wherein the color characteristic setting adjusted by the user input comprises a setting that modifies a value of at least one color.

3. A method as claimed in claim 1, further comprising controlling display of a user interface including an adjustment element changeable by a user to adjust the color characteristic setting for modifying the transformed image.

4. A method as claimed in claim 1, wherein generating the rule comprises using the color characteristic setting to produce functions of a rule in the first color space and mapping the rule in the first color space to the generated rule defined in the second color space.

5. A method as claimed in claim 1, further comprising controlling printing of the modified transformed image.

6. A method as claimed in claim 1, wherein the first color space is a standard Red, Green, Blue (sRGB) color space, and the second color space is a device Red, Green, Blue (dRGB) color space.

7. A method as claimed in claim 1, wherein the modified transformed image imitates what the image will look like when printed on media.

8. A method as claimed in claim 1, wherein a first of the functions represents a first of the colors in the second color space, and a second of the functions represents a second of the colors in the second color space.

9. Apparatus comprising:
a controller implemented at least in hardware to:
transform an image, defined in a first color space, to a second color space;
control display of the transformed image;
generate a rule defined in the second color space in response to a color characteristic setting adjusted by a user input, the rule including functions representing respective colors of the second color space, the functions computed based on the color characteristic setting adjusted by the user input;
modify a color characteristic of the transformed image using the rule defined in the second color space, wherein modifying the color characteristic comprises applying the functions to respective color values of the transformed image; and
control display of the modified transformed image.

10. Apparatus as claimed in claim 9, wherein the color characteristic setting adjusted by the user input comprises settings that modify respective values for different colors.

11. Apparatus as claimed in claim 9, wherein the controller is arranged to control display of a user interface including adjustable elements changeable by a user to adjust the color characteristic setting for modifying the transformed image.

12. Apparatus as claimed in claim 9, wherein the controller is arranged to use the color characteristic setting to produce functions of a rule in the first color space and is arranged to map the rule in the first color space to the generated rule defined in the second color space.

13. Apparatus as claimed in claim 9, wherein the controller is arranged to control printing of the modified transformed image.

14. Apparatus as claimed in claim 9, wherein the first color space is a standard Red, Green, Blue (sRGB) color space, and the second color space is a device Red, Green, Blue (dRGB) color space.

15. Apparatus as claimed in claim 9, wherein the modified transformed image imitates what the image will look like when printed on media.

16. Apparatus as claimed in claim 9, wherein the apparatus is a printer and further comprises a display and a user input device.

17. Apparatus as claimed in claim 9, wherein a first of the functions represents a first of the colors in the second color space, and a second of the functions represents a second of the colors in the second color space.

18. A non-transitory computer-readable storage medium storing instructions that upon execution cause a controller to:
 transform an image, defined in a first color space, to a second color space;
 receive a user input defining a color characteristic setting;
 generate a rule using the color characteristic setting, the rule including functions representing respective colors of the second color space, the functions computed based on the color characteristic setting defined by the user input; and
 modify the transformed image displayed in the second color space using the generated rule, wherein modifying the transformed image comprises applying the functions to respective color values of the transformed image.

19. A method as claimed in claim 18, further comprising controlling display of a user interface including an adjustable element changeable by a user to adjust the color characteristic setting for modifying the transformed image.

20. A method as claimed in claim 18, further comprising controlling printing of the modified image in response to a user input.

* * * * *